United States Patent

[11] 3,582,162

| [72] | Inventor | Max Baermann |
| | | 506 Bensberg, Bezirk, Cologne, Germany |
| [21] | Appl. No. | 873,592 |
| [22] | Filed | Nov. 3, 1969 |
| [45] | Patented | June 1, 1971 |

[54] TEMPERATURE COMPENSATED PERMANENT MAGNET BEARING
8 Claims, 3 Drawing Figs.

| [52] | U.S. Cl. | 308/10 |
| [51] | Int. Cl. | F16c 39/06 |
| [50] | Field of Search | 308/10; 324/105, 155 |

[56] References Cited

UNITED STATES PATENTS

| 801,497 | 10/1905 | Wood | 308/10 |
| 1,754,085 | 4/1930 | Faus | 324/155 |
| 2,233,781 | 3/1941 | Indergand | 324/155 |
| 2,254,698 | 4/1941 | Hansen | 324/155 |
| 2,311,382 | 2/1943 | Hansen | 308/10 |
| 3,143,704 | 8/1964 | Wright | 324/155 |
| 3,476,449 | 11/1969 | Chaboseau | 308/10 |

*Primary Examiner*—Milton O. Hirshfield
*Assistant Examiner*—R. Skudy
*Attorney*—Meyer, Tilberry & Body ABSTRACT: A permanent magnet bearing having a bimetallic or fluid device for compensating for changes in the strength of the magnets due to variations in temperature by physically moving one or both of the magnets relative to a fixed reference. The magnetic bearing is intended for use with apparatus of the type having a fixed support member and a support member rotatable about an axis with respect to the fixed support member. One or both of the magnets have a temperature-responsive member disposed between the magnet and its associated supporting member and so constructed as to move the magnets toward or away from their supporting member in amounts proportional to the tendency for the spacing between the magnets to increase or decrease due to variations in their magnetic strength caused by temperature changes. This maintains the rotatable support member in a preselected axial position relative to the fixed support member.

PATENTED JUN 1 1971
3,582,162
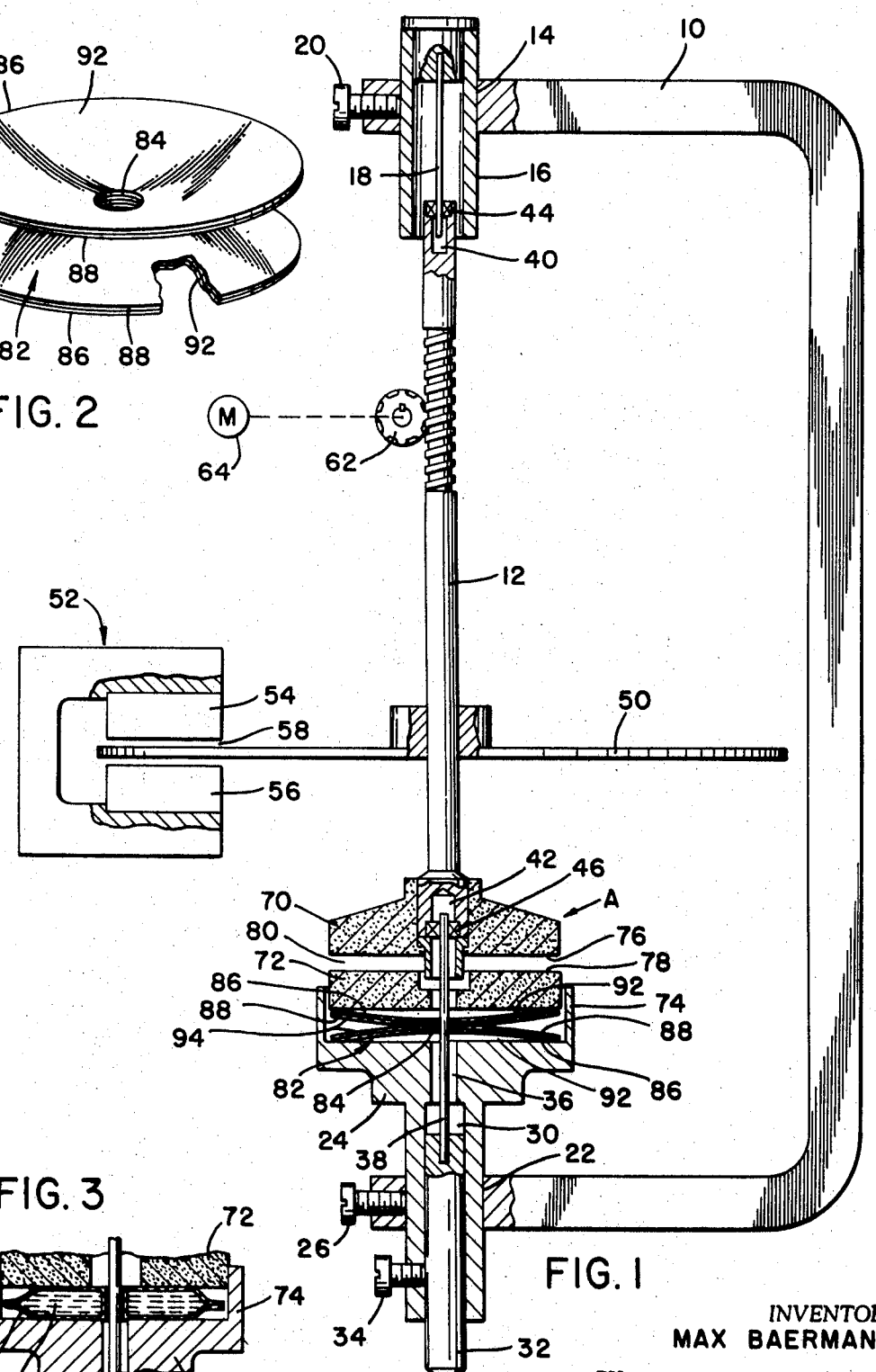
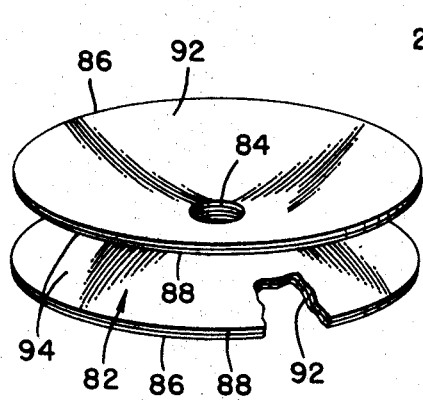
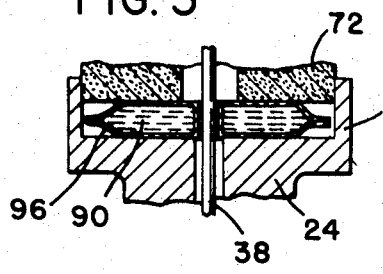
INVENTOR.
MAX BAERMANN
BY
Meyer, Tilberry & Body
ATTORNEYS

TEMPERATURE COMPENSATED PERMANENT MAGNET BEARING

This invention pertains to the bearing art, and more particularly to an improved permanent magnet bearing.

The invention is particularly applicable for supporting the rotating member of an electrical meter and will be described with specific reference thereto; however, it will be appreciated that the invention has much broader applications and may be used as a bearing for a variety of precision devices.

Magnetic bearings are common in electrical measuring devices wherein the attraction forces between unlike magnetic poles or the repelling forces between like magnetic poles are used for rotatably supporting one member of the measuring device with respect to another member of the device which is generally fixed. In most instances, the particular construction of the electrical measuring device makes use of the repelling forces between like magnetic poles.

Magnetic bearings of the type described above as used in an electric meter usually include a permanent magnet secured to the rotatable member and a similar magnet secured to and supported on the fixed member. The magnets each include a pole surface which is preferably circumferentially magnetized, that is, magnetized to have one magnetic pole adjacent the internal cylindrical surface of the magnet and an opposite magnetic pole adjacent the external cylindrical surface of the magnet. By arranging like poles in corresponding positions, the repelling forces between the like poles may be conveniently used for supporting the rotatable member in spaced-apart relationship with respect to the fixed member. A meter braking disc is secured to the rotatable member and rotates in an airgap intermediate a pair of braking magnets.

In order for the above-described electric meter to function properly, it is essential that the braking disc be substantially centrally located in the airgap intermediate the braking magnets, despite changes in temperature and the influence of demagnetizing forces. For example, changes in the surrounding temperature will affect the induction of the bearing magnets, which in turn will cause an increase or decrease in the airgap. When this occurs the rotatable member will be axially displaced, thereby altering the location of the braking disc relative to the braking magnets, thereby affecting the proper operation of the meter.

To date, no magnetic material has been developed which when incorporated in a bearing will meet all of the requirements set forth above. For example, magnet material comprised of iron, aluminum, nickel and cobalt is very stable against changes in temperature; its induction only changes by 0.2 percent per 10° C. However, this type of magnet material is unsuitable because it is very susceptible to demagnetizing fields resulting from short circuit currents or high meter loads, both of which result in a very strong alternating magnetic field. This is especially true in installations where the current coil is arranged near the magnetic bearing. Additionally, lightning can produce strong current pulses in the lines resulting in high demagnetizing fields.

It is also possible to construct magnets which use ferrites, such as barium, strontium or lead ferrites, that have a very high coercive force and a very small magnetic and electrical conductivity. While such magnetic materials possess stability against demagnetizing influences, their highly coercive nature makes them quite susceptible to changes in temperature. For example, the inductive force would vary by approximately 20 percent for every 10° C. change in temperature, that is, the density of the lines of magnetic force per centimeter squared will decrease by 2 percent. When used in electrical meters, such magnetic bearings might be subjected to temperature changes of up to 100° C. This would result in an induction change of 20 percent thereby causing an intolerable variation in the width of the airgap between the bearing magnets and hence in the location of the braking disc relative to the braking magnets.

If permanent magnet bearings are to comply with the requirements discussed above, they must be provided with a temperature adjustment device. Heretofore, such devices have taken the form of a magnetic shunt manufactured from a magnetizable material having a low curie point. In most instances, alloys of iron with about 30 percent nickel hive been employed for such purposes. When the surrounding temperature changes, the permeability of the shunt is reduced to the same degree as the induction of the magnetic bearing is decreased, whereby a substantially equal magnetic flux is maintained in the airgap.

Shunt type prior art devices have proved unsuccessful due to the fact that they cause a debilitation of the magnet, whereby part of the available lines of magnetic force are more or less short circuited by the shunt. Furthermore, the installation of such devices is often quire difficult, especially if the magnetic circuit of the bearing is so designed that the position of the bearing is as stable as possible.

The present invention contemplates a new and improved apparatus which overcomes all of the above-referred problems and others, and provides a permanent magnet bearing wherein the rotatable member is maintained substantially in a preselected axial position despite changes in temperature and magnetic condition, whereby the braking disc remains centrally located intermediate the braking magnets.

In accordance with the present invention there is provided a permanent magnet bearing for use with apparatus of the type having a fixed member and a member rotatable about an axis with respect thereto, the rotatable member being in a preselected axial position, comprising: a pair of permanent magnets; each of the magnets including a pole surface; pole surfaces being opposed to one another and so magnetized as to bias the magnets into axially spaced-apart relationship to define an airgap therebetween; one of the magnets being connected to the fixed member and the other of the magnets being connected to the rotatable member; and means operatively associated with at least one of the magnets for axially displacing the magnets relative to said fixed member, whereby the rotatable member is maintained substantially in the preselected position despite changes in temperature and magnetic conditions.

The principal object of the present invention is to provide an improved temperature-compensated permanent magnet bearing wherein the rotatable member is maintained substantially in the preselected position despite changes in temperature and magnetic conditions.

Another object of the present invention is to provide an improved temperature-compensated permanent magnet bearing which possesses good stability against demagnetizing influences.

A further object of the present invention is to provide an improved temperature-compensated permanent magnet bearing which is not affected by changes in surrounding temperature.

A still further object of the present invention is to provide an an improved temperature-compensated permanent magnet bearing which does not cause an overall weakening in the magnetic force developed by the bearing magnets.

Yet another object of the present invention is to provide an improved temperature-compensated magnet bearing which automatically compensates for changes in temperature.

These and other objects and advantages will become apparent from the following description used to illustrate the preferred embodiments of the present invention when read in conjunction with the accompanying drawings in which:

FIG. 1 is a longitudinal partial cross-sectional view of a permanent magnet bearing constructed in accordance with the present invention;

FIG. 2 is an enlarged perspective view of the temperature compensation means of FIG. 1; and FIG. 3 is a cross-sectional view of a portion of an alternative embodiment of the permanent magnet bearing of FIG. 1.

Referring now to the drawings wherein the showings are for the purpose of illustrating the preferred embodiments of the invention only and not for the purpose of limiting same, FIG. 1 shows a partial cross section taken through the rotor shaft portion of an electric meter, said portion including a magnetic bearing, designated generally by the reference letter A, constructed in accordance with the present invention.

The rotor shaft portion of the electric meter includes a bearing pedestal 10 and a rotor shaft 12. The upper end of the pedestal 10 has a bore 14 in which is adjustably disposed a shell 16 having an upper guiding needle 18 coaxially retained therein. The shell 16 may be axially adjusted within the bore 14 by means of an upper adjusting screw 20. The lower end of the pedestal 10 has a bore 22 in which is adjustably disposed a carrier body 24, the axial adjustment of said body within the bore being facilitated by a lower adjusting screw 26. The carrier body 24 includes an internal passageway 30 and a holding pin 32 disposed within said passageway. The holding pin 32 may be axially adjusted relative to the carrier body 24 and held in any adjusted position by a setscrew 34. Extending axially upward from the holding pin 32 and passing through a necked-down portion 36 of the passageway 30 is a lower guiding needle 38.

The rotor shaft 12 has a bore 40 which extends axially downwardly from the uppermost end of the shaft and a bore 42 which extends axially upwardly from the lowermost end of the shaft. Secured in the upper bore 40 is a bearing ring 44 which engages the upper guiding needle 18. In similar fashion, there is retained in the lower bore 42 a bearing ring 46 which engages the lower guiding needle 38. In this manner, there exists a fixed member, namely the carrier body 24 and a member rotatable about an axis with respect thereto, namely the rotor shaft 12.

Secured to the rotor shaft 12 for rotation therewith is a meter braking disc 50 which rotates through a braking magnet system, designated generally by the reference numeral 52. The braking magnet system 52 includes a pair of meter braking magnets 54, 56 in spaced-apart relationship to define an airgap 58 therebetween. In this arrangement, the meter braking disc 50 rotates in the airgap 58. The rotor shaft 12 further includes a worm gear segment 60 which is formed integrally with the shaft. The worm gear segment 60 is a driving engagement with a driven gear 62 which actuates the counting apparatus of the electric meter. For purposes of clarity, the counting apparatus has been shown schematically and designated generally by the reference numeral 64.

The permanent magnet bearing A is comprised of an upper permanent magnet 70 and a lower permanent magnet 72. The upper permanent magnet 70 is secured to the lower end of the rotor shaft 12 and the lower permanent magnet 72 is adjustably supported in a guiding ring 74 which extends upward from the carrier body 24. By means of this arrangement the lower permanent magnet 72 may be axially displaced relative to the carrier body 24. The upper permanent magnet 70 includes a pole surface 76 and the lower permanent magnet 72 includes a pole surface 78. The pole surfaces 76, 78 are opposed to one another and so magnetized as to bias the magnets 70, 72 into axial spaced-apart relationship to define an airgap 80 therebetween.

In accordance with the present invention there is provided temperature responsive means operatively associated with one of the magnets 70, 72 for axially displacing said magnet relative to the fixed member which may take a variety of forms, such as liquid, solid or gas; however, in the preferred embodiment of the present invention it takes the form of a bimetallic member designated generally by the reference numeral 82 which is responsive to changes in temperature. The bimetallic member 82 includes a central opening 84 through which the lower guiding needle 38 passes. The bimetallic member 82 is retained in the carrier body 24 beneath the lower permanent magnet 72 and is prevented from lateral displacement by the guiding ring 74.

As best shown in FIG. 2, the bimetallic member 82 is comprised of a pair of discs of dishshaped configuration having a first metallic portion 86 and a second metallic portion 88. The portions 86, 88 are preferably integrally formed, one of said portions having a relatively high coefficient of thermal expansion and the other of said portions having a relatively low coefficient of thermal expansion. In the embodiment illustrated in FIG. 2, the first portion 86 has a low coefficient of thermal expansion and is preferably constructed from an iron-nickel alloy. The second portion 88 has a high coefficient of thermal expansion and is preferably constructed from an alloy comprising manganese, copper and nickel. The first portion 86 includes a concave surface 92 and the second portion 88 includes a convex surface 94 (as shown in FIG. 2). The expansion or contraction of the bimetallic member in response to increases or decreases in temperature will be opposite in direction to axial changes in the width of the airgap 80, thereby providing a compensating means to maintain the braking disc 50 in its proper location. Although the member 82 can vary greatly in dimension, a suitable arrangement involves a pair of discs having an outside diameter of approximately 17 mm., a central opening of approximately 8 mm. and approximately 0.25 mm. in thickness. When the bimetallic member 82 is constructed in accordance with the foregoing dimensions there will be an expansion or contraction of approximately 0.90 mm. per 100° C. of temperature increase or decrease.

Although the member 82 has been shown as comprising a pair of concave discs, it is to be appreciated that it could have numerous other configurations, such as a cross-shaped bimetallic member, and be constructed out of various metals, so long as the end result yields a means which is responsive to changes in temperature and capable of axially displacing the magnet with which it is associated in the manner to be described below.

An increase in the surrounding meter temperature will result in a corresponding decrease in magnetic induction, thereby causing the air gap 80 to be reduced. When this occurs, the rotor shaft 12 and the meter braking disc 50, which are initially in a preselected position, will be displaced downward, whereby the centralized location of the braking disc in the airgap 58 will be disturbed. In order for the braking magnet system 52 to operate accurately and efficiently, it is essential that the meter braking disc 50 remain centrally located intermediate the meter braking magnets 54, 56. Thus, it is critical to the operational characteristics of the electric meter that the rotor shaft 12 be maintained substantially in the preselected position. The bimetallic member 82 assures that such conditions exist, in as much as it is responsive to variations in temperature and changes in magnetic conditions. More specifically, the bimetallic member 82 will expand in the axial direction to the same extent that the airgap 80 was reduced. In this manner, the axial displacement of the rotor shaft 12 and meter braking disc 50 due to a decrease in magnetic induction is equally offset by the expansion of the bimetallic member 82 to create a balanced condition and thus maintain the shaft in the preselected position, whereby the distance between the meter braking disc 50 inside the airgap 58 and the meter braking magnets 54, 56 will always remain constant. If there is a decrease in the surrounding temperature, the bimetallic member 82 will contract to offset the increase in the airgap 80 which is directly attributable to a rise in magnetic induction.

Reference is now made to FIG. 3, wherein there is shown an alternative embodiment of the present invention. In this embodiment the bimetallic member 82 has been eliminated and the axial displacement means takes the form of a fluid 90 which is responsive to fluctuations in temperature. The fluid 90 is carried in an elastic container 96 which responds to the expansion or contraction of the fluid. The container 96 and its fluid contents are disposed intermediate the carrier body 24 and the lower permanent magnet 72 and are maintained in this position with the aid of the guiding ring 74. It is to be appreciated that the fluid 90 can either take the form of a liquid or a gas, and any number of fluids would be suitable, provided they are responsive to temperature changes so as to axially displace the lower magnet 72 upward when the airgap 80 is reduced and downward when the airgap is increased. A suggested suitable fluid is alcohol. The operational features of this embodiment are identical to those heretofore discussed.

Although the invention is described with reference to specific embodiments, variations within the scope of the following claims will be apparent to those skilled in the art.

I claim:

1. A permanent magnet bearing for sue with apparatus of the type including a fixed member and a member rotatable about an axis with respect thereto and having a preselected axial position, relative to said fixed member, comprising: a pair of permanent magnets; each of said magnets including a pole surface; said pole surfaces being opposed to one another and so magnetized as to bias said magnets into axial spaced-apart relationship to define an airgap therebetween; one of said magnets being associated with said fixed member and the other end of said magnets being connected to said rotatable member; and at least one nonmagnetic temperature-responsive means operatively associated with at least one of said magnets for axially displacing said magnet relative to its associated member according to the surrounding temperature to maintain said rotatable member substantially in said preselected axial position relative to said fixed member despite changes in the surrounding temperature and magnetic conditions of said magnets.

2. The permanent magnet bearing defined in claim 9, wherein said temperature-responsive means comprises a fluid, which fluid either expands or contracts upon temperature changes to displace the magnet with which it is operatively associated.

3. The permanent magnet bearing defined in claim 2, further including an elastic container, said fluid being carried in said container.

4. The permanent magnet bearing defined in claim 9, wherein said temperature-responsive means comprises a bimetallic member 5. The permanent magnet bearing defined in claim 4, wherein said bimetallic member includes first and second portions, one of said portions having a relatively high coefficient of thermal expansion and the other of said portions having a relatively low coefficient of thermal expansion.

6. The permanent magnet bearing defined in claim 5, wherein said bimetallic member comprises a pair of concave discs, each of said discs having said first and second portions, said first portions including a concave metallic surface and said second portions including a convex metallic surface.

7. The permanent magnet bearing defined in claim 6, wherein said first portions are comprised of an iron-nickel alloy and said second portions are comprised of a manganese-copper-nickel alloy.

8. The permanent magnet bearing defined in claim 9, wherein at least one of said magnets is retained in a carrier body and said temperature-responsive means is disposed intermediate said carrier body and said magnet.

UNITED STATES PATENT OFFICE
CERTIFICATE OF CORRECTION

Patent No. 3,582,162                     Dated June 1, 1971

Inventor(s) MAX BAERMANN

It is certified that error appears in the above-identified patent and that said Letters Patent are hereby corrected as shown below:

Column 2, line 2, change "curie" to -- Curie --.

Column 2, line 3, change "hive" to "have"

Claim 1, line 1, change "sue" to "use"

Claims 2, 4 and 8, line 1, change "9" to "1"

Signed and sealed this 8th day of October 1974.

(SEAL)
Attest:

McCOY M. GIBSON JR.  
Attesting Officer

C. MARSHALL DANN  
Commissioner of Patents